(12) United States Patent
Hamanaka et al.

(10) Patent No.: US 8,829,861 B2
(45) Date of Patent: Sep. 9, 2014

(54) POWER CONVERTER

(75) Inventors: Yoshiyuki Hamanaka, Kariya (JP); Koichi Sakata, Okazaki (JP)

(73) Assignees: Denso Corporation, Kariya (JP); Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 13/513,383

(22) PCT Filed: May 11, 2011

(86) PCT No.: PCT/JP2011/060881
§ 371 (c)(1),
(2), (4) Date: Jun. 1, 2012

(87) PCT Pub. No.: WO2011/142396
PCT Pub. Date: Nov. 17, 2011

(65) Prior Publication Data
US 2012/0236617 A1    Sep. 20, 2012

(30) Foreign Application Priority Data
May 11, 2010    (JP) ................... 2010-109550

(51) Int. Cl.
| H02J 7/00 | (2006.01) |
| H02P 1/00 | (2006.01) |
| H02M 7/5387 | (2007.01) |
| H02M 1/08 | (2006.01) |
| H02M 1/32 | (2007.01) |

(52) U.S. Cl.
CPC ............ *H02M 1/32* (2013.01); *H02M 7/5387* (2013.01); *H02M 1/08* (2013.01); *H02J 7/0065* (2013.01)
USPC .......................................... 320/166; 318/139

(58) Field of Classification Search
USPC ............ 318/139, 176, 801; 320/166; 307/110
See application file for complete search history.

(56) References Cited

U.S. PATENT DOCUMENTS

| 5,619,107 A * | 4/1997 | Shinohara et al. ............ 318/139 |
| 6,798,175 B2 * | 9/2004 | Hanada et al. ................ 320/166 |

(Continued)

FOREIGN PATENT DOCUMENTS

| CN | 101018008 | 8/2007 |
| JP | 2005-229689 | 8/2005 |

(Continued)

OTHER PUBLICATIONS

International Search Report for PCT/JP2011/060881, mailed Jul. 12, 2011.

(Continued)

*Primary Examiner* — Eduardo Colon Santana
*Assistant Examiner* — Bickey Dhakal
(74) *Attorney, Agent, or Firm* — Nixon & Vanderhye PC

(57) ABSTRACT

A motor control apparatus includes an inverter, a smoothing capacitor, power-converting drivers, a power-converting power supply circuit, and discharging drivers. The inverter includes switching circuits comprised of series-connected two IGBTs. The power-converting drivers apply an output voltage of the power-converting power supply circuit to the switching circuits to drive them, thus performing power conversion. The discharging drivers simultaneously turn on IGBTs of the switching circuit to discharge the smoothing capacitor when the output voltage of the power-converting power supply circuit is equal to or lower than a threshold. This prevents discharging of the smoothing capacitor during power converting operations.

15 Claims, 4 Drawing Sheets

(56) References Cited

U.S. PATENT DOCUMENTS

| | | | |
|---|---|---|---|
| 7,622,898 B2 * | 11/2009 | Shimizu et al. | 320/166 |
| 8,120,295 B2 * | 2/2012 | Soma et al. | 318/376 |
| 2007/0200521 A1 | 8/2007 | Ochiai et al. | |

FOREIGN PATENT DOCUMENTS

| | | |
|---|---|---|
| JP | 2007-195352 | 8/2007 |
| JP | 101018008 | 8/2007 |
| JP | 2008-206313 | 9/2008 |
| JP | 2008-306795 | 12/2008 |
| JP | 2009-232620 | 10/2009 |
| JP | 2009232620 A * | 10/2009 |

OTHER PUBLICATIONS

International Preliminary Report on Patentability dated Dec. 20, 2012, issued in counterpart Japanese Application No. PCT/JP2011/060881 with English translation.

Office Action (7 page) dated Apr. 17, 2014, issued in corresponding Chinese Application No. 201180007892.2 and English translation (9 pages).

* cited by examiner

US 8,829,861 B2

POWER CONVERTER

This application is the U.S. national phase of International Application No. PCT/JP2011/060881, filed 11 May 2011, which designated the U.S. and claims priority to Japan Application No. 2010-109550, filed 11 May 2010, the entire contents of each of which are hereby incorporated by reference.

TECHNICAL FIELD OF THE INVENTION

The present invention relates to power converters equipped with a switching circuit consisting of a plurality of switching elements connected in series, and a smoothing capacitor connected in parallel to the switching circuit.

BACKGROUND ART

Typical power converters are comprised of a switching circuit consisting of a plurality of switching elements connected in series, and a smoothing capacitor connected in parallel to the switching circuit. An example of such power converters is disclosed in a first patent document, and another example of them is disclosed as a motor control apparatus in a second patent document.

The power converter disclosed in the first patent document is comprised of a power converting circuit, a smoothing capacitor, and a controller. The power converting circuit is configured such that three legs each consisting of series-connected two switching elements are connected in parallel to each other. The power converting circuit and the smoothing capacitor are connected between the positive terminal and the negative terminal of a DC power source.

For power conversion, the controller turns on or off the switching elements of the power converting circuit at preset timings to convert DC power outputted from the DC power source into three-phase AC power, thus supplying the three-phase AC power to a motor.

On the other hand, for discharging the smoothing capacitor, the controller turns on the two switching elements of a leg simultaneously to discharge the charge stored in the smoothing capacitor. This prevents electrical shock due to the charge stored in the smoothing capacitor.

The motor control apparatus disclosed in the second patent document is provided with a converter, a low-side capacitor, a high-side capacitor, and an MG_ECU. The converter has two transistors connected in series. The low-side capacitor and the low-side transistor of the two series-connected transistors are connected between the positive and negative terminals of a battery. The two series-connected transistors and the high-side capacitor are connected between input terminals of an inverter.

For power conversion, the MG_ECU turns on or off the two transistors of the converter at preset timings to convert DC power with a low voltage outputted from the battery into DC power, thus supplying it to the inverter.

On the other hand, for discharging the high-side capacitor, the MG_ECU turns on the low-side transistor of the two transistors of the converter, and turns off the high-side transistor, thus discharging the charge stored in the low-side capacitor. Thereafter, the MG_ECU turns on the low-side transistor, and turns on the high-side transistor, thus discharging the charge stored in the high-side capacitor. This charges the low-side capacitor. Thereafter, these operations are repeated, so that the charge stored in the high-side capacitor is discharged. That is, alternately turning on the low-side transistor and the high-side transistor discharges the charge stored in the high-side capacitor. This prevents electrical shock due to the charge stored in the high-side capacitor.

ART DISCUSSED ABOVE

Patent Document

First patent document: Japanese Patent Laid-Open No. 2009-232620

Second patent document Japanese Patent Laid-Open No. 2008-306795

DISCLOSURE OF THE INVENTION

Problems to be Solved by the Invention

A driver and a power supply circuit are required to drive switching elements, such as transistors. If a set of a driver and a power supply circuit for driving switching elements to convert power and a set of a driver and a power supply circuit for discharging a smoothing capacitor or a high-side capacitor were separately provided, this might cause the smoothing capacitor or the high-side capacitor to discharge during power converting operations.

In view of the above circumstances, an object of the present invention is to provide power converters having a function of discharging a smoothing capacitor, which are designed to prevent the smoothing capacitor from being discharged during power converting operations.

Means for Solving the Problems

Thus, as a result of a process of trial and error for solving this problem, the inventors have come up with an idea that driving a switching element based on an output voltage of a power-converting power supply circuit allows discharging of a smoothing capacitor during power converting operations to be prevented, and therefore, the inventors have completed the present invention.

Specifically, a power converter according to an example embodiment of the invention includes: a switching circuit comprised of a plurality of switching elements connected in series; a smoothing capacitor connected in parallel to the switching circuit; a power-converting driver that drives the plurality of switching elements for power conversion; a power-converting power supply circuit that outputs, to the power-converting driver, a voltage for driving the plurality of switching elements; a discharging driver that drives the plurality of switching elements for discharging charge stored in the smoothing capacitor; and a discharging power supply circuit that supplies, to the discharging driver, a voltage for driving the plurality of switching elements. The discharging driver drives, based on the voltage outputted from the power-converting power supply circuit, the plurality of switching elements to discharge the charge stored in the smoothing capacitor.

With the configuration set forth above, the switching circuit is driven based on the voltage supplied from the power-converting power supply circuit to perform power conversion. For this reason, it is possible to determine, based on the output voltage of the power-converting power supply circuit, whether the switching circuit is ready to perform power conversion. Thus, discharging the smoothing capacitor based on the output voltage of the power-converting power supply circuit can prevent discharging of the smoothing capacitor during power converting operations.

In an example embodiment of the invention, the discharging driver drives the plurality of switching elements to discharge the charge stored in the smoothing capacitor when the voltage outputted from the power-converting power supply circuit becomes equal to or lower than a threshold. With this configuration, the switching circuit is not ready to perform power conversion when the output voltage of the power-converting power supply circuit becomes equal to or lower than the threshold. For this reason, discharging the smoothing capacitor when the output voltage of the power-converting power supply circuit becomes equal to or lower than the threshold can reliably prevent discharging of the smoothing capacitor during power converting operations.

In an example embodiment of the invention, the power converter further includes a control circuit that controls the power-converting power supply circuit and the discharging driver. The discharging driver drives the plurality of switching elements based on the voltage outputted from the power-converting power supply circuit and a discharging instruction inputted to the discharging driver from the control circuit to discharge the charge stored in the smoothing capacitor. With this configuration, the discharging instruction from the control circuit controls discharging of the smoothing capacitor. Thus, the control circuit can prevent discharging of the smoothing capacitor during power converting operations.

In an example embodiment of the invention, the discharging driver drives the plurality of switching elements based on the voltage outputted from the power-converting power supply circuit and an instruction inputted to the discharging driver from the control circuit to discharge the charge stored in the smoothing capacitor when the voltage outputted from the power-converting power supply circuit becomes equal to or lower than a threshold, and the discharging instruction is inputted to the discharging driver from the control circuit. With this configuration, the discharging instruction from the control circuit reliably controls discharging of the smoothing capacitor. Thus, the control circuit can reliably prevent discharging of the smoothing capacitor during power converting operations.

In an example embodiment of the invention, the discharging power supply circuit generates, based on the charge stored in the smoothing capacitor, the voltage for driving the plurality of switching elements. With this configuration, even if a system power source for activating the power converter is shut down, it is possible to drive the plurality of switching elements, thus reliably discharging the smoothing capacitor.

A power converter embodying the invention may be installed in a vehicle, to convert power of a DC power source, and supply converted power to an electric device. With this configuration, in the power converter installed in the vehicle and designed to convert the power of the DC power source to supply converted power to the electric device, it is possible to reliably prevent discharging of the smoothing capacitor during power converting operations.

EMBODIMENTS FOR CARRYING OUT THE INVENTION

Embodiments of the present invention will be described in detail hereinafter. In these embodiments, a power converter according to the present invention is applied to a motor control apparatus installed in a vehicle and designed to convert DC power outputted from a battery into three-phase AC power, and to supply the three-phase AC power to a three-phase AC motor.

First Embodiment

The structure of a motor control apparatus according to the first embodiment will be described first with reference to FIG. 1. Here, FIG. 1 is a circuit diagram of the motor control apparatus according to the first embodiment.

Figure 1:
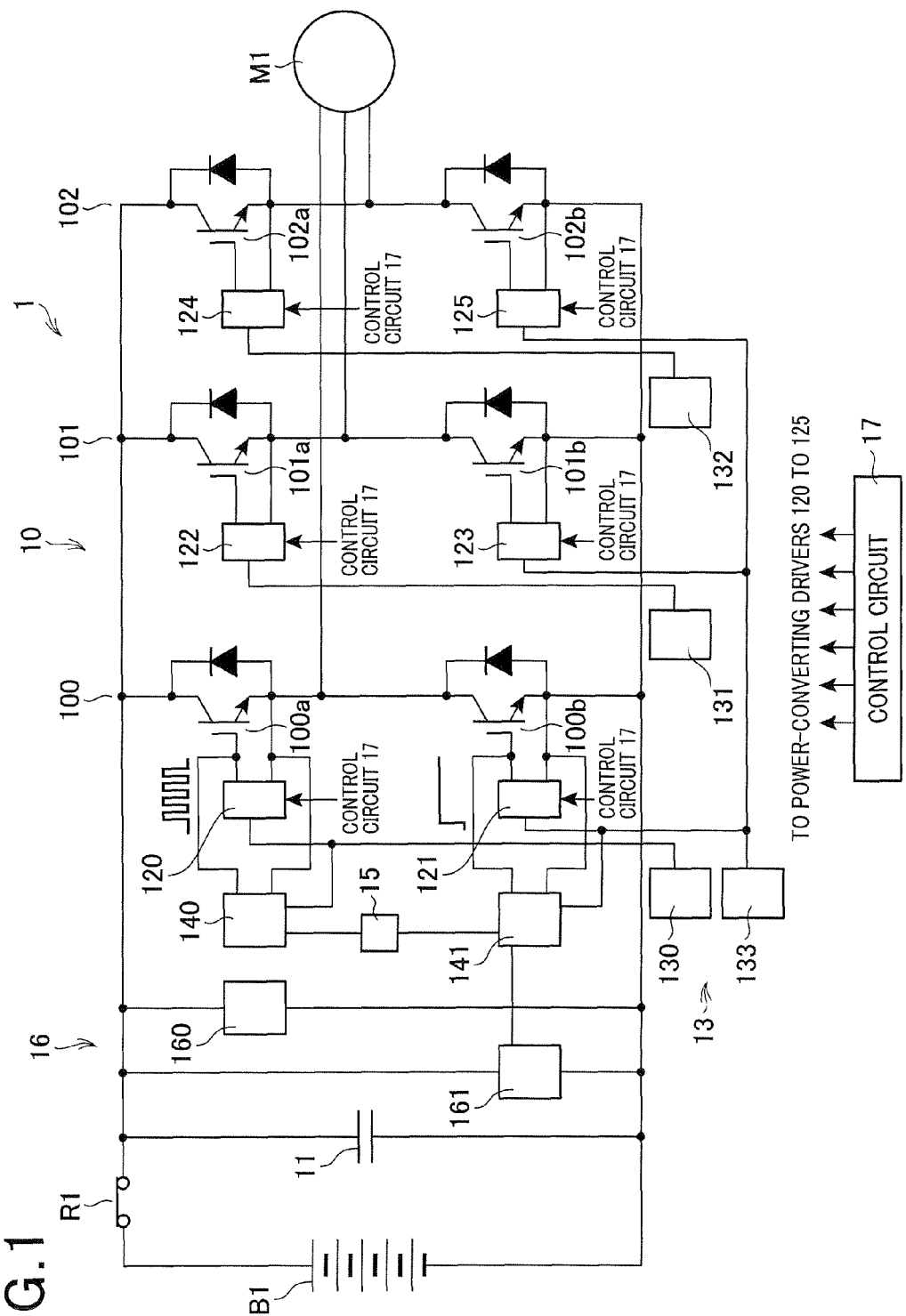
FIG. 1 is a circuit diagram of a motor control apparatus according to the first embodiment.

The motor control apparatus (a power converter) 1 illustrated in FIG. 1 is an apparatus that converts DC power outputted from a high-voltage battery (a DC power source) B1 into three-phase AC power to supply the three-phase AC power to a three-phase AC motor (an electrical device) M1, thus driving the three-phase AC motor M1. The motor control apparatus 1 includes an inverter 10, a smoothing capacitor 11, power-converting drivers 120 to 125, a power-converting power supply circuit 13, discharging drivers 140 and 141, a photocoupler 15, a discharging power supply circuit 16, and a control circuit 17.

The inverter 10 is a circuit that converts DC power outputted from the high-side battery B1 into three-phase AC power. The inverter 10 is provided with three switching circuits 100 to 102. The switching circuit 100 corresponds to a switching circuit according to the present invention.

The switching circuit 100 is comprised of two IGBTs (a plurality of switching elements) 100a and 100b connected in series. The emitter of the IGBT 100a is connected to the collector of the IGBT 100b. The switching circuit 101 is comprised of two IGBTs 101a and 101b connected in series. The emitter of the IGBT 101a is connected to the collector of the IGBT 101b. The switching circuit 102 is comprised of two IGBTs 102a and 102b connected in series. The emitter of the IGBT 102a is connected to the collector of the IGBT 102b. The three switching circuits 100 to 102 are connected in parallel to each other.

The collectors of the IGBTs 100a to 102a are connected to the positive terminal of the high-voltage battery B1 via a relay R1, and the emitters of the IGBTs 100a to 102a are connected to the negative terminal of the high-voltage battery B1. The gate and emitter of each of the IGBTs 100a, 100b, 101a, 101b, 102a, and 102b are connected to a corresponding one of the power-converting drivers 120 to 125. The gate and emitter of each of the IGBTs 100a and 100b are connected to a corresponding one of the discharging drivers 140 and 141. A series connection point through which the IGBTs 100a and 100b are connected in series, a series connection point through which the IGBTs 101a and 101b are connected in series, and a series connection point through which the IGBTs 102a and 102b are connected in series are connected to the three-phase AC motor M1.

The smoothing capacitor 11 is an element for smoothing DC power outputted from the high-voltage battery B1. One end of the smoothing capacitor 11 is connected to the positive terminal of the high-voltage battery B1 via the relay R1, and the other end is connected to the negative terminal of the high-voltage battery B1. This results in the smoothing capacitor 11 being connected in parallel to the switching circuit 100.

The power-converting drives 120, 121, 122, 123, 124, and 125 are provided for the IGBTs 100a, 100b, 101a, 101b, 102a, and 102b, respectively, and are connected to the control circuit 17. Each of the power-converting drivers 120, 121, 122, 123, 124, and 125 is also connected to the gate and emitter of a corresponding one of the IGBTs 100a, 100b, 101a, 101b, 102a, and 102b. For power conversion, the power-converting drivers 120, 121, 122, 123, 124, and 125 drive, based on power-converting drive signals outputted from the control circuit 17, the IGBTs 100a, 100b, 101a, 101b, 102a, and 102b, respectively.

The power-converting power supply circuit 13 is a circuit that supplies voltages for driving the IGBTs 100a, 100b, 101a, 101b, 102a, and 102b to the power-converting drivers 120, 121, 122, 123, 124, and 125, respectively. The power supply circuit 13 is provided with power supply circuits 130 to 133.

For power conversion, the power supply circuits 130 to 133 generate, from an output voltage of a system power source (not shown), voltages for driving the IGBTs, and supply the voltages to the power-converting drivers 120 to 125 that drive the IGBTs 100a, 100b, 101a, 101b, 102a, and 102b. The power supply circuits 130, 131, and 132 are connected to the power-converting drivers 120, 122, and 124, respectively, and the power supply circuit 133 is connected to the power-converting drivers 121, 123, and 125.

The photo coupler 15 is an element that transmits a discharging drive signal to the discharging driver 140 while insulating it. An input terminal of the photo coupler 15 is connected to the discharging driver 141, and an output terminal of the photo coupler 15 is connected to the discharging driver 140.

The discharging drivers 140 and 141 are provided for the IGBTs (switching elements) 100a and 100b, respectively. Each of the discharging drivers 140 and 141 is connected to the gate and emitter of a corresponding one of the IGBTs 100a and 100b, and is also connected to an output terminal of a corresponding one of the power supply circuits 130 and 133. Each of the discharging drivers 140 and 141 is further connected to the photo coupler 15 and the discharging power supply circuit 16.

The discharging drivers 140 and 141 are circuits that drive the respective IGBTs 100a and 100b based on the magnitude of the output voltage from the power supply circuit 13 during discharging of the smoothing capacitor 11.

The discharging driver 141 drives the IGBT 100b based on a discharging drive signal when the output voltage of the power supply circuit 133 is equal to or lower than a preset threshold close to 0 V during discharging of the smoothing capacitor 11; the discharging drive signal is generated by the discharging driver 141. Then, the discharging driver 141 generates a discharging drive signal for driving the IGBT 100a to output the discharging drive signal to the discharging driver 140. The discharging driver 140 drives the IGBT 100a based on the discharging drive signal inputted from the discharging driver 141 via the photocoupler 15 when the output voltage of the power supply circuit 133 is equal to or lower than the preset threshold close to 0 V during the discharging of the smoothing capacitor 11.

The discharging power supply circuit 16 is a circuit that supplies, to the discharging drivers 140 and 141, a voltage for driving the IGBTs 100a and 100b during discharging of the smoothing capacitor 11. The discharging power supply circuit 16 is comprised of power supply circuits 160 and 161.

Input terminals of each of the power supply circuits 160 and 161 are connected to the respective terminals of the smoothing capacitor 11, and output terminals of the power supply circuits 160 and 161 are connected to the discharging drivers 140 and 141, respectively.

Each of the power supply circuits 160 and 161 is a circuit that generates, based on the charge stored in the smoothing capacitor 11, a voltage for driving an IGBT during discharging of the smoothing capacitor 11, and supplies the voltage to a corresponding one of the discharging drivers 140 and 141 for driving the respective IGBTs 100a and 100b.

The control circuit 17 is equipped with a microcomputer. The control circuit 17 is connected to the power-converting drivers 120 to 125. The control circuit 17 is a circuit that outputs, to the power-converting drivers 120 to 125, power-converting drive signals based on externally inputted instructions, phase currents in the three-phase AC motor M1 inputted thereto from the three-phase AC motor M1, and the like.

Next, power converting operations will be described. The power supply circuits 130 to 133 generate voltages based on the voltage of the system power source, and supply the voltages to the power-converting drivers 120 to 125. The control circuit 17 outputs the power-converting drive signals based on the externally inputted instructions, the phase currents in the three-phase AC motor M1 inputted thereto from the three-phase AC motor M1, and the like. The power-converting drivers 120 to 125 apply, based on the power-converting drive signals, the voltages supplied from the power supply circuits 130 to 133 to the IGBTs 100a, 100b, 101a, 101b, 102a, and 102b, thus turning on or off the IGBTs 100a, 100b, 101a, 101b, 102a, and 102b at preset timings. This allows the DC power outputted from the high-voltage battery B1 to be converted into three-phase AC power, and the three-phase AC power is supplied to the three-phase AC motor M1. The supply of the three-phase AC power causes the three-phase motor M1 to generate drive power.

Next, operations for discharging of the smoothing capacitor will be described. Prior to start of discharging of the smoothing capacitor 11, for example, operations of the control circuit 17 turn off the relay R1. Each of the power supply circuits 160 and 161 generates a voltage based on the charge stored in the smoothing capacitor 11, and supplies the voltage to a corresponding one of the discharging drivers 140 and 141. The discharging driver 141 applies, to the IGBT 100b, the voltage supplied from the power supply circuit 161 according to a discharging drive signal generated by itself when the output voltage of the power supply circuit 133 becomes 0 V equal to or lower than the threshold, thus turning on the IGBT 100b first and keeping the IGBT 100b in its on state.

In addition, the discharging driver 141 generates the discharging drive signal for driving the IGBT 100a, and outputs it. The photocoupler 15 transmits, to the discharging driver 140, the discharging drive signal outputted from the discharging driver 141 while insulating it.

When the output voltage of the power supply circuit 130 becomes 0 V equal to or lower than the threshold, the discharging driver 140 applies, to the IGBT 100a, the voltage supplied from the power supply circuit 160 according to the discharging drive signal outputted from the discharging driver 141 after the turn-on of the IGBT 100b, thus repeatedly turning on the IGBT 100a for a very short period. That is, the IGBT 100b is turned on, and thereafter simultaneous turn-on of the IGBTs 100a and 100b for a micro period are repeatedly performed. This allows the charge stored in the smoothing capacitor 11 to be discharged.

In other words, the duty cycle of the IGBT 100a is controlled with the IGBT 100b being on. This control reduces the amount of generated heat per unit of time.

Next, advantages will be described. According to the first embodiment, the switching circuits 100 to 102 are driven on the voltage supplied from the power-converting power supply circuit 13, and adapted to perform power conversion. For this reason, it is possible to understand whether the switching circuits 100 to 102 are ready to perform power conversion according to the output voltage of the power-converting power supply circuit 13. Thus, discharging of the smoothing capacitor 11 based on the output voltage of the power-converting power supply circuit 13 can reliably prevent discharging of the smoothing capacitor 11 during power converting operations.

In addition, according to the first embodiment, when the output voltage of the power-converting power supply circuit 13 is equal to or lower than the threshold, the switching circuit 100 becomes incapable of performing power conversion. For this reason, when the output voltage of the power-converting power supply circuit 13, more specifically, the output voltage of each of the power supply circuits 130 and 133 becomes equal to or lower than threshold, the smoothing capacitor 11 is discharged. This reliably prevents discharging of the smoothing capacitor 11 during power converting operations.

Moreover, according to the first embodiment, each of the power supply circuits 160 and 161 generates a voltage based on the charge stored in the smoothing capacitor 11, and supplies the voltage to a corresponding one of the discharging drivers 140 and 141 for driving the respective IGBTs 100a and 100b. For this reason, even after the system power source for activating the motor control apparatus 1 is shut off, it is possible to drive the IGBTs 100a and 100b, thus reliably discharging the smoothing capacitor 11.

Second Embodiment

Next, a motor control apparatus according to the second embodiment will be described. The motor control apparatus according to the first embodiment discharges the smoothing capacitor based on the output voltage of the power-converting power source. In contrast, the motor control apparatus according to the second embodiment discharges a smoothing capacitor based on the output voltage of a power converting power source and a discharging instruction from a control circuit.

The structure of a motor control apparatus according to the second embodiment will be described first with reference to FIG. 2. Here, FIG. 2 is a circuit diagram of the motor control apparatus according to the second embodiment.

Figure 2:
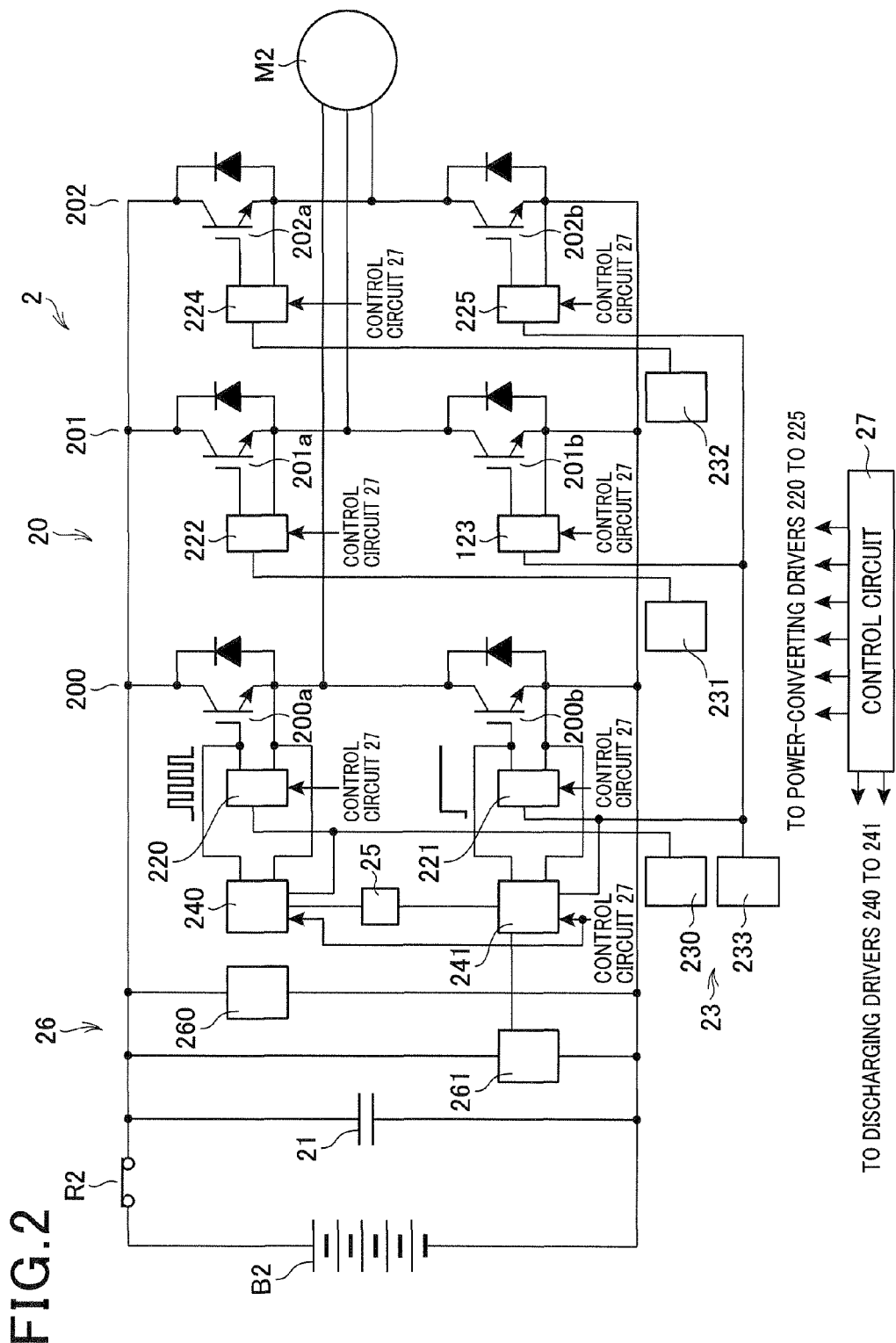
FIG. 2 is a circuit diagram of a motor control apparatus according to the second embodiment.

The motor control apparatus (a power converter) 2 illustrated in FIG. 2 includes an inverter 20, a smoothing capacitor 21, power-converting drivers 220 to 225, a power-converting power supply circuit 23, discharging drivers 240 and 241, a photocoupler 25, a discharging power supply circuit 26, and a control circuit 27. The inverter 20, smoothing capacitor 21, power-converting drivers 220 to 225, power-converting power supply circuit 23, photocoupler 25, and discharging power supply circuit 26 are substantially identical in structure to the inverter 10, smoothing capacitor 11, power-converting drivers 120 to 125, power-converting power supply circuit 13, photocoupler 15, and discharging power supply circuit 16 according to the first embodiment, respectively, and therefore, the descriptions of them are omitted.

The discharging drivers 240 and 241 are connected to the control circuit 27 in addition to the gates and emitters of the respective IGBTs 200a and 200b, the output terminals of the respective power supply circuits 230 and 233, the photocoupler 25, and the discharging power supply circuit 26.

The discharging driver 241 drives the IGBT (switching element) 200b based on a discharging drive signal when the output voltage of the power supply circuit 233 is equal to or lower than a preset threshold close to 0 V and a discharging instruction instructing discharging is inputted thereto from the control circuit 27 during discharging of the smoothing capacitor 21; the discharging drive signal is generated by the discharging driver 241. Then, the discharging driver 241 generates a discharging drive signal for driving the IGBT 200a to output the discharging drive signal to the discharging driver 240. The discharging driver 240 drives the IGBT 200a based on the discharging drive signal inputted from the discharging driver 241 via the photocoupler 25 when the output voltage of the power supply circuit 233 is equal to or lower than the preset threshold close to 0 V and a discharging instruction instructing discharging is inputted thereto from the control circuit 27 during the discharging of the smoothing capacitor 21.

Next, operations for discharging of the smoothing capacitor will be described.

The discharging driver 241 applies, to the IGBT 200b, the voltage supplied from the power supply circuit 261 according to a discharging drive signal generated by itself when the output voltage of the power supply circuit 233 becomes 0 V equal to or lower than the threshold and the discharging instruction is inputted thereto from the control circuit 27, thus turning on the IGBT 200b first and keeping the IGBT 200b in its on state.

In addition, the discharging driver 241 generates the discharging drive signal for driving the IGBT 200a, and outputs it. The photocoupler 25 transmits, to the discharging driver 240, the discharging drive signal outputted from the discharging driver 241 while insulating it.

When the output voltage of the power supply circuit 230 becomes 0 V equal to or lower than the threshold and the discharging instruction is inputted thereto from the control circuit 27, the discharging driver 240 applies, to the IGBT 200a, the voltage supplied from the power supply circuit 260 according to the discharging drive signal outputted from the discharging driver 241 after the turn-on of the IGBT 200b, thus repeatedly turning on the IGBT 200a for a micro period. That is, the discharging driver 240 turns on the IGBT 200b, and thereafter repeatedly performs simultaneous turn-on of the IGBTs 200a and 200b for a micro period. This allows the charge stored in the smoothing capacitor 21 to be discharged.

Next, advantages will be described. According to the second embodiment, it is possible to control discharging of the smoothing capacitor 21 based on the discharging instruction from the control circuit 27. This allows discharging of the smoothing capacitor 21 during power converting operations to be reliably prevented.

Third Embodiment

Next, a motor control apparatus according to the third embodiment will be described.

The structure of the motor control apparatus according to the third embodiment will be described first with reference to FIG. 3. Here, FIG. 3 is a circuit diagram of the motor control apparatus according to the third embodiment.

Figure 3:
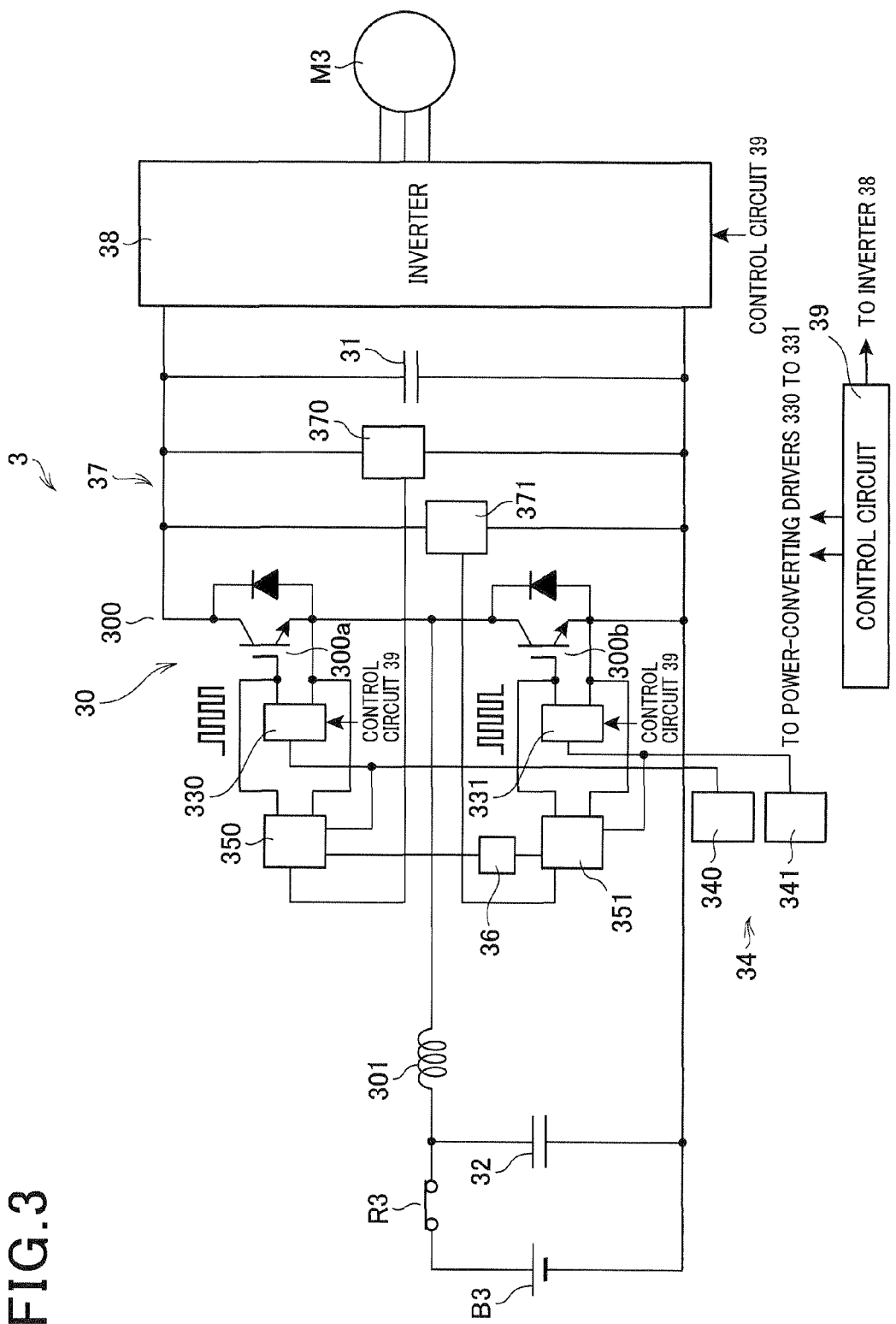
FIG. 3 is a circuit diagram of a motor control apparatus according to the third embodiment.

The motor control apparatus (a power converter) 3 illustrated in FIG. 3 is an apparatus that converts low-voltage DC power outputted from a low-voltage battery (a DC power source) B3 into high-voltage DC power, and converts the high-voltage DC power into three-phase AC power to supply the three-phase AC power to a three-phase AC motor (an electrical device) M3, thus driving the three-phase AC motor M3. The motor control apparatus 3 includes a converter 30, a high-voltage smoothing capacitor (a smoothing capacitor) 31, a low-voltage smoothing capacitor 32, power-converting drivers 330 and 331, a power-converting power supply circuit 34, discharging drivers 350 and 351, a photocoupler 36, a discharging power supply circuit 37, an inverter 38, and a control circuit 39.

The converter 30 is a circuit that converts low-voltage DC power outputted from the low-voltage battery B3 into high-voltage DC power. The converter 30 is provided with a switching circuit 300 and a reactor 301.

The switching circuit 300 is comprised of two IGBTs (a plurality of switching elements) 300a and 300b connected in series. The emitter of the IGBT 300a is connected to the collector of the IGBT 300b. The collector of the IGBT 300a and the emitter of the IGBT 300b are connected to the inverter 38. The emitter of the IGBT 300b is also connected to the negative terminal of the low-voltage battery B3. The gate and emitter of each of the IGBT 300a and 300b are connected to a corresponding one of the power-converting drivers 330 and 331 and to a corresponding one of the discharging drivers 350 and 351. A series connection point through which the IGBTs 300a and 300b are connected in series is connected to the positive terminal of the low-voltage battery B3 via the reactor 301 and a relay R3.

The high-voltage smoothing capacitor 31 is an element for smoothing high-voltage DC power boosted by the converter 30. One end of the high-voltage smoothing capacitor 31 is connected to the collector of the IGBT 300a, and the other end is connected to the emitter of the IGBT 300b. This results in the high-voltage smoothing capacitor 31 being connected in parallel to the switching circuit 300.

The low-voltage smoothing capacitor 32 is an element for smoothing DC power outputted from the low-voltage battery B3. One end of the low-voltage smoothing capacitor 32 is connected to the positive terminal of the low-voltage battery B3 via the relay R3, and the other end is connected to the negative terminal of the low-voltage battery B3. The low-voltage smoothing capacitor 32 is connected in parallel to the IGBT 300b.

The power-converting drivers 330 and 331 are provided for the IGBTs 300a and 300b, respectively. The power-converting drivers 330 and 331 are connected to the control circuit 39, and to the gates and emitters of the respective IGBTs 300a and 300b. For power conversion, the power-converting drivers 330 and 331 drive, based on power-converting drive signals outputted from the control circuit 39, the IGBTs 300a and 300b, respectively.

The power-converting power supply circuit 34 is a circuit that supplies voltages for driving the IGBTs 300a and 300b to the power-converting drivers 330 and 331, respectively. The power supply circuit 34 is provided with power supply circuits 340 and 341.

The power supply circuits 340 and 341 are connected to the respective power-converting drivers 330 and 331, and generate, based on the output voltage of a system power source (not shown), voltages for driving the IGBTs, thus supplying the voltages to the power-converting drivers 330 and 331 that drive the IGBTs 300a and 300b.

The photo coupler 36 is an element that transmits a discharging drive signal outputted from the discharging driver 351 to the discharging driver 350 while insulating it. An input terminal of the photo coupler 36 is connected to the discharging driver 351, and an output terminal of the photo coupler 36 is connected to the discharging driver 350.

The discharging drivers 350 and 351 are provided for the IGBTs (switching elements) 300a and 300b, respectively.

Each of the discharging drivers 350 and 351 is connected to the gate and emitter of a corresponding one of the IGBTs 300a and 300b, and is also connected to an output terminal of a corresponding one of the power supply circuits 340 and 341. Each of the discharging drivers 350 and 351 is further connected to the photo coupler 36 and the discharging power supply circuit 37.

The discharging drivers 350 and 351 are circuits that drive the respective IGBTs 300a and 300b based on the magnitude of the output voltage of the power-converting power supply circuit 34 during discharging of the high-voltage smoothing capacitor 31.

The discharging driver 351 drives the IGBT 300b based on a discharging drive signal when the output voltage of the power supply circuit 341 is equal to or lower than a preset threshold close to 0 V during discharging of the high-voltage smoothing capacitor 31; the discharging drive signal is generated by the discharging driver 351. Then, the discharging driver 351 generates a discharging drive signal for driving the IGBT 300a to output the discharging drive signal to the discharging driver 350. The discharging driver 350 drives the IGBT 300a based on the discharging drive signal inputted from the discharging driver 351 via the photocoupler 36 when the output voltage of the power supply circuit 340 is equal to or lower than the preset threshold close to 0 V during the discharging of the high-voltage smoothing capacitor 31.

The discharging power supply circuit 37 is a circuit that supplies, to the discharging drivers 350 and 351, a voltage for driving the IGBTs 300a and 300b during discharging of the high-voltage smoothing capacitor 31. The discharging power supply circuit 37 is comprised of power supply circuits 370 and 371.

Input terminals of each of the power supply circuits 370 and 371 are connected to the respective terminals of the high-voltage capacitor 31, and output terminals of the power supply circuits 370 and 371 are connected to the discharging drivers 350 and 351, respectively. Each of the power supply circuits 370 and 371 is a circuit that generates, based on the charge stored in the high-voltage smoothing capacitor 31, a voltage for driving an IGBT during discharging of the high-voltage smoothing capacitor 31, and supplies the voltage to a corresponding one of the discharging drivers 350 and 351 for driving the respective IGBTs 300a and 300b.

The inverter 38 is a device that converts high-voltage DC power boosted by the converter 30 into three-phase AC power, and supplies the three-phase AC power to the three-phase AC motor M3. Input terminals of the inverter 38 are connected to the collector of the IGBT 300a and the emitter of the IGBT 300b, respectively. Output terminals of the inverter 38 are connected to the three-phase AC motor M3.

The control circuit 39 is equipped with a microcomputer. The control circuit 39 is connected to the power-converting drivers 330 and 331, and the inverter 38.

The control circuit 39 is a circuit that outputs, to the power-converting drivers 330 and 331, power-converting drive signals based on externally inputted instructions, phase currents in the three-phase AC motor M3 inputted thereto from the three-phase AC motor M3, and the like. The control circuit 39 is also a circuit that controls the inverter 38.

Next, power converting operations will be described. The power supply circuits 340 and 341 generate voltages based on the voltage of the system power source, and supply the voltages to the power-converting drivers 330 and 331. The control circuit 39 outputs the power-converting drive signals based on the externally inputted instructions, the phase currents in the three-phase AC motor M3 inputted thereto from the three-phase AC motor M3, and the like.

The power-converting drivers 330 and 331 apply, based on the power-converting drive signals outputted from the control circuit 39, the voltages supplied from the power supply circuits 340 and 341 to the IGBTs 300a and 300b, thus turning on or off the IGBTs 300a and 300b at preset timings. This allows the low-voltage DC power outputted from the low-voltage battery B3 to be converted into high-voltage DC power, and the high-voltage DC power is supplied to the inverter 38. The inverter 38 is controlled by the control circuit 39 to convert the high-voltage DC power into three-phase AC power, and supply the three-phase AC power to the three-phase AC motor M3. The supply of the three-phase AC power causes the three-phase motor M3 to generate drive power.

Next, operations for discharging of the high-voltage smoothing capacitor will be described. Prior to start of discharging of the high-voltage smoothing capacitor 31, for example, operations of the control circuit 39 turn off the relay R3. Each of the power supply circuits 370 and 371 generates a voltage based on the charge stored in the high-voltage smoothing capacitor 31, and supplies the voltage to a corresponding one of the discharging drivers 350 and 351. The discharging driver 351 applies, to the IGBT 300b, the voltage supplied from the power supply circuit 371 according to a discharging drive signal generated by itself when the output voltage of the power supply circuit 341 becomes 0 V equal to or lower than the threshold, thus turning on the IGBT 300b first, and thereafter, repeatedly turning on and off the IGBT 300b.

In addition, the discharging driver 351 generates the discharging drive signal for driving the IGBT 300a, and outputs it. The photocoupler 36 transmits, to the discharging driver 350, the discharging drive signal outputted from the discharging driver 351 while insulating it.

When the output voltage of the power supply circuit 340 becomes 0 V equal to or lower than the threshold, the discharging driver 350 applies, to the IGBT 300a, the output voltage of the power supply circuit 370 according to the discharging drive signal outputted from the discharging driver 351, thus alternately turns on the IGBT 300a and the IGBT 300b, and thereafter, repeatedly turns on and off them. That is, the IGBT 300b is turned on, and thereafter, the IGBT 300a and IGBT 300b are alternately turns on.

That is, turn-on of the IGBT 300b causes the charge stored in the low-voltage smoothing capacitor 32 to be discharged. Next, turn-on of the IGBT 300a causes the charge stored in the high-voltage smoothing capacitor to be discharged, so that the charge charges the low-voltage smoothing capacitor 31. Then, turn-on of the IGBT 300b causes the charge stored in the low-voltage smoothing capacitor 32 to be discharged. Thereafter, these operations are repeated. This results in the charge stored in the high-voltage smoothing capacitor 31 being discharged via the low-voltage smoothing capacitor 32.

Next, advantages will be described. According to the third embodiment, the same advantages as those of the first embodiment can be achieved.

Fourth Embodiment

Next, a motor control apparatus according to the fourth embodiment will be described. The motor control apparatus according to the third embodiment discharges the smoothing capacitor based on the output voltage of the power-converting power source. In contrast, the motor control apparatus according to the fourth embodiment discharges a smoothing capacitor based on the output voltage of a power converting power source and a discharging instruction from a control circuit.

Figure 4:
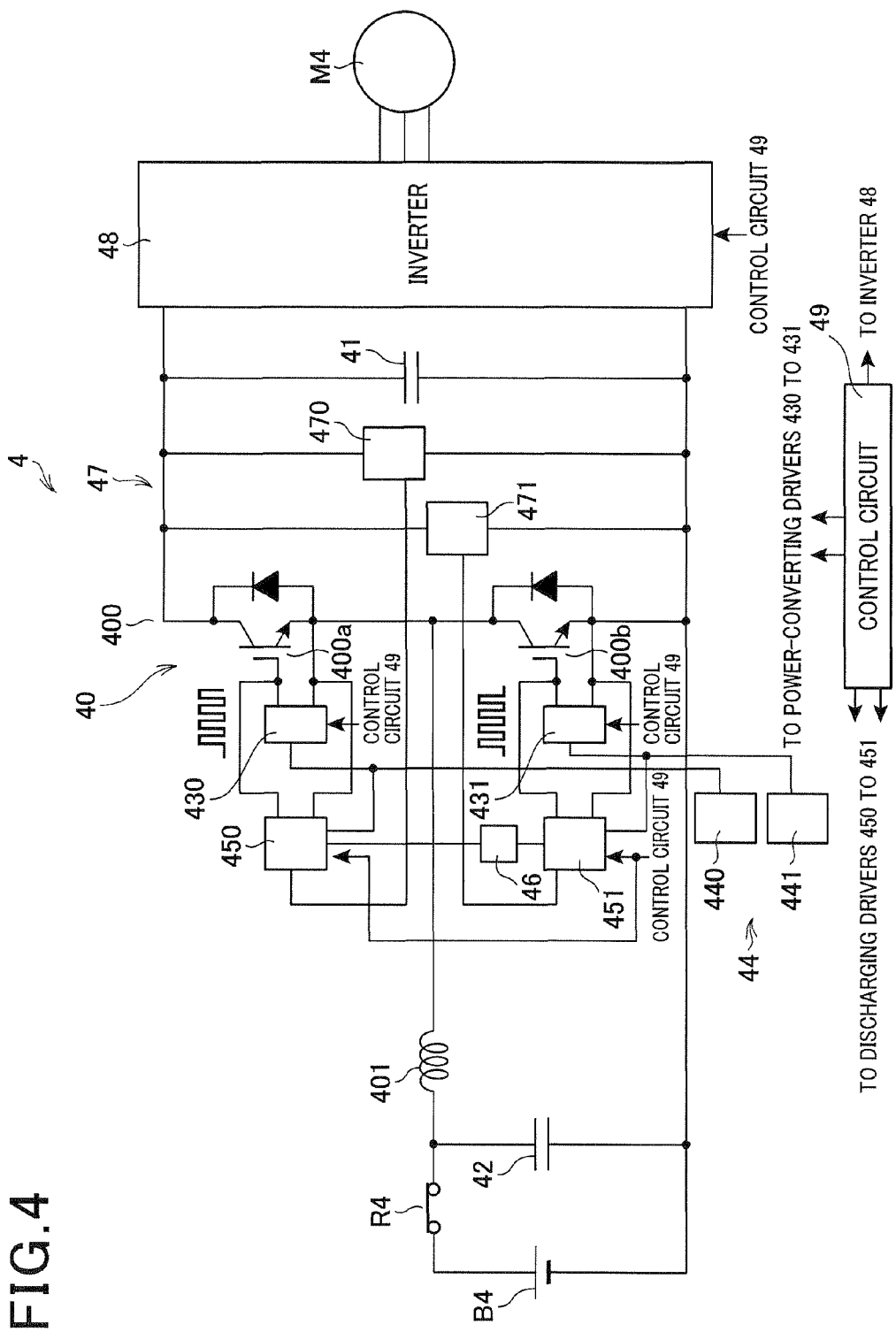
FIG. 4 is a circuit diagram of a motor control apparatus according to the fourth embodiment.

The structure of a motor control apparatus according to the fourth embodiment will be described first with reference to FIG. 4. Here, FIG. 4 is a circuit diagram of the motor control apparatus according to the fourth embodiment.

The motor control apparatus (a power converter) 4 includes a converter 40, a high-voltage smoothing capacitor (a smoothing capacitor) 41, a low-voltage smoothing capacitor 42, power-converting drivers 430 and 431, a power-converting power supply circuit 44, discharging drivers 450 and 451, a photocoupler 46, a discharging power supply circuit 47, an inverter 48, and a control circuit 49. The converter 40, the high-voltage smoothing capacitor 41, the low-voltage smoothing capacitor 42, the power-converting drivers 430 and 431, the power-converting power supply circuit 44, the photocoupler 46, the discharging power supply circuit 47, and the inverter 48 are substantially identical in structure to the converter 30, the high-voltage smoothing capacitor 31, the low-voltage smoothing capacitor 32, the power-converting drivers 330 and 331, the power-converting power supply circuit 34, the photocoupler 36, the discharging power supply circuit 37, and the inverter 38 according to the third embodiment, respectively, and therefore, the descriptions of them are omitted.

The discharging drivers 450 and 451 are connected to the control circuit 49 in addition to the gates and emitters of the respective IGBTs 400a and 400b, the output terminals of the respective power supply circuits 440 and 441, the photocoupler 46, and the discharging power supply circuit 47.

The discharging driver 451 drives the IGBT (switching element) 400b based on a discharging drive signal when the output voltage of the power supply circuit 441 is equal to or lower than a preset threshold close to 0 V and a discharging instruction instructing discharging is inputted thereto from the control circuit 49 during discharging of the high-voltage smoothing capacitor 41; the discharging drive signal is generated by the discharging driver 451. Then, the discharging driver 451 generates a discharging drive signal for driving the IGBT (a switching element) 400a to output the discharging drive signal to the discharging driver 450. The discharging driver 450 drives the IGBT 400a based on the discharging drive signal inputted from the discharging driver 451 via the photocoupler 46 when the output voltage of the power supply circuit 440 is equal to or lower than the preset threshold close to 0 V and a discharging instruction instructing discharging is inputted thereto from the control circuit 49 during the discharging of the high-voltage smoothing capacitor 41.

Next, operations for discharging of the high-voltage smoothing capacitor will be described.

The discharging driver 451 applies, to the IGBT 400b, the voltage supplied from the power supply circuit 471 according to a discharging drive signal generated by itself when the output voltage of the power supply circuit 441 becomes 0 V equal to or lower than the threshold and the discharging instruction is inputted thereto from the control circuit 49, thus turning on the IGBT 400b first, and thereafter, repeatedly turning on and off the IGBT 400b.

In addition, the discharging driver 451 generates the discharging drive signal for driving the IGBT 400a, and outputs it. The photocoupler 46 transmits, to the discharging driver 450, the discharging drive signal outputted from the discharging driver 451 while insulating it.

When the output voltage of the power supply circuit 440 becomes 0 V equal to or lower than the threshold and the discharging instruction is inputted thereto from the control circuit 49, the discharging driver 450 applies, to the IGBT 400a, the output voltage of the power supply circuit 470 according to the discharging drive signal outputted from the discharging driver 451, thus alternately turns on the IGBT 400a and the IGBT 400b, and thereafter, repeatedly turns on and off them. This results in the charge stored in the high-voltage smoothing capacitor 41 being discharged via the low-voltage smoothing capacitor 42.

Next, advantages will be described. According to the fourth embodiment, the same advantages as those of the second embodiment can be achieved in addition to the advantages of the third embodiment.

Note that the first to fourth embodiments give an example that a switching circuit is composed of two IGBTs connected in series, but they are not limited thereto. A switching circuit can be comprised of three or more switching elements connected in series.

In addition, the first to fourth embodiments give an example that a discharging driver for driving a low-side IGBT generates a discharging drive signal, but they are not limited thereto. A discharging drive signal can be generated outside of a discharging driver, and the discharging drive signal can be inputted to a discharging driver for driving a high-side IGBT and a discharging driver for driving a low-side IGBT.

DESCRIPTION OF CHARACTERS 1 to 4 Motor control apparatus
10, 20 Inverter
100 to 102, 200 to 202, 300, 400 Switching circuit
100a, 100b, 200a, 200b, 300a, 300b, 400a, 400b IGBT (switching elements)
101a, 101b, 102a, 102b, 201a, 201b, 202a, 202b IGBT
11, 21 Smoothing capacitor
120 to 125, 220 to 225, 330, 331, 430, 431 Power-converting power supply circuit
130 to 133, 230 to 233, 340, 341, 440, 441 Power supply circuit
140, 141, 240, 241, 350, 351, 450, 451 Discharging driver
15, 36 Photocoupler
16, 26, 37, 47 Discharging power supply circuit
160, 161, 260, 261, 370, 371, 470, 471 Power supply circuit
17, 27, 39, 49 Control circuit
30, 40 Converter
301, 401 Reactor
31, 41 High-voltage smoothing capacitor (smoothing capacitor)
32, 42 Low-voltage smoothing capacitor
38, 48 Inverter
B1, B2 High-voltage battery (DC power source)
B3, B4 Low-voltage battery (DC power source)
M1 to M4 Three-phase AC motor
R1 to R4 Relay

The invention claimed is:

1. A power converter comprising:
a switching circuit comprised of a plurality of switching elements connected in series;
a smoothing capacitor connected in parallel to the switching circuit;
a power-converting driver that drives the plurality of switching elements for power conversion;
a power-converting power supply circuit that outputs, to the power-converting driver, a voltage that drives the plurality of switching elements to perform the power conversion;
a discharging driver that drives the plurality of switching elements for discharging charge stored in the smoothing capacitor; and
a discharging power supply circuit that supplies, to the discharging driver, a voltage for driving the plurality of switching elements,
wherein the discharging driver drives, based on the voltage outputted from the power-converting power supply circuit, the plurality of switching elements to discharge the charge stored in the smoothing capacitor.

2. The power converter according to claim 1, wherein the discharging driver drives the plurality of switching elements to discharge the charge stored in the smoothing capacitor when the voltage outputted from the power-converting power supply circuit becomes equal to or lower than a threshold.

3. The power converter according to claim 1, further comprising a control circuit that controls the power-converting power supply circuit and the discharging driver,
wherein the discharging driver drives the plurality of switching elements based on the voltage outputted from the power-converting power supply circuit and a discharging instruction inputted to the discharging driver from the control circuit to discharge the charge stored in the smoothing capacitor.

4. The power converter according to claim 1, wherein the discharging power supply circuit generates, based on the charge stored in the smoothing capacitor, the voltage for driving the plurality of switching elements.

5. The power converter according to claim 1, wherein the power converter is installed in a vehicle, and converts power of a DC power source, and supplies converted power to an electric device.

6. The power converter according to claim 2, wherein the discharging power supply circuit generates, based on the charge stored in the smoothing capacitor, the voltage for driving the plurality of switching elements.

7. The power converter according to claim 2, wherein the power converter is installed in a vehicle, converts power of a DC power source, and supplies converted power to an electric device.

8. The power converter according to claim 3, wherein the discharging driver drives the plurality of switching elements based on the voltage outputted from the power-converting power supply circuit and an instruction inputted to the discharging driver from the control circuit to discharge the charge stored in the smoothing capacitor when the voltage outputted from the power-converting power supply circuit becomes equal to or lower than a threshold, and the discharging instruction is inputted thereto from the control circuit.

9. The power converter according to claim 3, wherein the discharging power supply circuit generates, based on the charge stored in the smoothing capacitor, the voltage for driving the plurality of switching elements.

10. The power converter according to claim 3, wherein the power converter is installed in a vehicle, converts power of a DC power source, and supplies converted power to an electric device.

11. The power converter according to claim 4, wherein the power converter is installed in a vehicle, converts power of a DC power source, and supplies converted power to an electric device.

12. The power converter according to claim 8, wherein the discharging power supply circuit generates, based on the charge stored in the smoothing capacitor, the voltage for driving the plurality of switching elements.

13. The power converter according to claim 8, wherein the power converter is installed in a vehicle, converts power of a DC power source, and supplies converted power to an electric device.

14. A power converter comprising:
a switching circuit comprised of a plurality of switching elements connected in series;
a smoothing capacitor connected in parallel to the switching circuit;
a power-converting driver that drives the plurality of switching elements for power conversion;
a power-converting power supply circuit that outputs, to the power-converting driver, a voltage for driving the plurality of switching elements;
a discharging driver that drives the plurality of switching elements for discharging charge stored in the smoothing capacitor; and
a discharging power supply circuit that supplies, to the discharging driver, a voltage for driving the plurality of switching elements,
wherein the discharging driver drives, based on the voltage outputted from the power-converting power supply circuit, the plurality of switching elements to discharge the charge stored in the smoothing capacitor; and
the plurality of switching elements are a first switching element and a second switching element, and the discharging driver repeatedly turns on and off the second switching element while keeping the first switching element in on state.

15. A power converter comprising:
a switching circuit comprised of a plurality of switching elements connected in series;
a first smoothing capacitor connected in parallel to the switching circuit;
a power-converting driver that drives the plurality of switching elements for power conversion;
a power-converting power supply circuit that outputs, to the power-converting driver, a voltage for driving the plurality of switching elements;
a second smoothing capacitor connected in parallel to the power-converting power supply circuit;
a discharging driver comprising:
 a first driver that drives a first switching element in the plurality of switching elements for discharging charge stored in the first smoothing capacitor; and
 a second driver that drives a second switching element in the plurality of switching elements for discharging charge stored in the second smoothing capacitor; and
a discharging power supply circuit that supplies, to the discharging driver, a voltage for driving the plurality of switching elements,
wherein:
the discharging driver drives, based on the voltage outputted from the power-converting power supply circuit, the plurality of switching elements to discharge the charge stored in each of the first and second smoothing capacitors, the first smoothing capacitor is configured such that the charge stored in the first smoothing capacitor is discharged to be stored in the second smoothing capacitor with the first switching element being in on state, and the first and second drivers alternately turn on and off the first and second switching elements.

* * * * *